US011157165B2

(12) United States Patent
Baudry et al.

(10) Patent No.: US 11,157,165 B2
(45) Date of Patent: Oct. 26, 2021

(54) PERMANENT SYNCHRONIZATION SYSTEM FOR HANDWRITING INPUT

(71) Applicant: MYSCRIPT, Nantes (FR)

(72) Inventors: Edgard Baudry, Nantes (FR); Denis Manceau, Le Loroux-bottereau (FR); Robin Melinand, Carquefou (FR); Arnoud Boekhoorn, Le Loroux-bottereau (FR); Nicolas Torneri, Carquefou (FR)

(73) Assignee: MYSCRIPT, Nantes (FR)

( * ) Notice: Subject to any disclaimer, the term of this patent is extended or adjusted under 35 U.S.C. 154(b) by 1138 days.

(21) Appl. No.: 14/786,819

(22) PCT Filed: Apr. 24, 2014

(86) PCT No.: PCT/FR2014/050991
§ 371 (c)(1),
(2) Date: Oct. 23, 2015

(87) PCT Pub. No.: WO2014/174219
PCT Pub. Date: Oct. 30, 2014

(65) Prior Publication Data
US 2016/0070462 A1    Mar. 10, 2016

(30) Foreign Application Priority Data
Apr. 24, 2013    (FR) .................................... 1353746

(51) Int. Cl.
*G06F 3/048*    (2013.01)
*G06F 3/0488*    (2013.01)
(Continued)

(52) U.S. Cl.
CPC ...... *G06F 3/04883* (2013.01); *G06F 3/04886* (2013.01); *G06F 40/10* (2020.01);
(Continued)

(58) Field of Classification Search
USPC ........................................................ 715/268
See application file for complete search history.

(56) References Cited

U.S. PATENT DOCUMENTS 5,596,350 A    1/1997    Capps et al.
5,698,822 A    12/1997    Haneda et al.
(Continued)

FOREIGN PATENT DOCUMENTS

EP    2 088 536 A1    8/2009
JP    H0757053 A    3/1995
(Continued)

OTHER PUBLICATIONS

International Search Report dated Jun. 23, 2014 issued in International Application No. PCT/FR2014/050991 filed Apr. 24, 2014, pp. 1-7.
(Continued)

*Primary Examiner* — Maikhanh Nguyen
(74) *Attorney, Agent, or Firm* — MH2 Technology Law Group LLP

(57) ABSTRACT

Disclosed is a device for inputting symbols in an entry field. An example of the device includes an interface unit having a touch screen and a module for processing graphics objects. The module may include a detection unit for detecting a start and an end of a current graphics object being input; a storage unit for storing graphics data corresponding to the input graphics object; a recognition unit for generating a list of candidate strings of symbols from the graphics data, each candidate string being associated with a pertinence value; and an insertion unit for inserting into the entry field a string selected by the user from the list, a data group comprising the graphics data, the candidate strings, the pertinence values, and an identifier of the selected string being stored during a predetermined duration.

16 Claims, 10 Drawing Sheets

(51) Int. Cl.
  *G06K 9/03* (2006.01)
  *G06K 9/00* (2006.01)
  *G06F 40/10* (2020.01)
  *G06F 40/171* (2020.01)
  *G06F 40/274* (2020.01)

(52) U.S. Cl.
  CPC .......... *G06F 40/171* (2020.01); *G06F 40/274* (2020.01); *G06K 9/00436* (2013.01); *G06K 9/033* (2013.01)

(56) References Cited

U.S. PATENT DOCUMENTS

| | | | |
|---|---|---|---|
| 5,710,832 | A | 1/1998 | Berman et al. |
| 5,838,302 | A | 11/1998 | Kuriyama et al. |
| 6,088,481 | A | 7/2000 | Okamoto et al. |
| 6,256,009 | B1 | 7/2001 | Lui et al. |
| 6,341,176 | B1 | 1/2002 | Shirasaki et al. |
| 6,408,092 | B1 | 6/2002 | Sites |
| 6,507,678 | B2 | 1/2003 | Yahagi |
| 6,577,296 | B2 | 6/2003 | Flack |
| 6,661,409 | B2 | 12/2003 | Demartines et al. |
| 7,013,046 | B2 | 3/2006 | Kawamura et al. |
| 7,158,678 | B2 | 1/2007 | Nagel et al. |
| 7,174,042 | B1 | 2/2007 | Simmons et al. |
| 7,193,616 | B2 | 3/2007 | Stavely et al. |
| 7,251,367 | B2 | 7/2007 | Zhai |
| 7,380,203 | B2 | 5/2008 | Keely et al. |
| 7,567,239 | B2 | 7/2009 | Seni |
| 7,571,384 | B1 | 8/2009 | Webb |
| 7,804,489 | B1 | 9/2010 | Gutter et al. |
| 7,885,464 | B2 | 2/2011 | Kawamura et al. |
| 8,094,938 | B2 | 1/2012 | Wang et al. |
| 8,116,569 | B2 | 2/2012 | Markiewicz et al. |
| 8,276,101 | B2 | 9/2012 | Li |
| 8,297,979 | B2 | 10/2012 | McIlvain et al. |
| 8,352,884 | B2 | 1/2013 | Zalewski et al. |
| 8,363,949 | B2 | 1/2013 | Rowley et al. |
| 9,170,734 | B2 | 10/2015 | Lee |
| 9,201,592 | B2 | 12/2015 | Akhavan Fomani et al. |
| 9,355,090 | B2 | 5/2016 | Goldsmith et al. |
| 9,417,790 | B2 | 8/2016 | Na et al. |
| 9,733,716 | B2 | 8/2017 | Shaffer |
| 9,846,536 | B2 | 12/2017 | Kienzle et al. |
| 10,088,977 | B2 | 10/2018 | Kim et al. |
| 10,228,839 | B2 | 3/2019 | Files et al. |
| 2002/0071607 | A1 | 6/2002 | Kawamura et al. |
| 2003/0007018 | A1 | 1/2003 | Seni et al. |
| 2003/0016873 | A1 | 1/2003 | Nagel et al. |
| 2003/0038788 | A1 | 2/2003 | Demartines et al. |
| 2004/0263486 | A1 | 12/2004 | Seni |
| 2006/0088216 | A1 | 4/2006 | Kawamura et al. |
| 2009/0087095 | A1 | 4/2009 | Webb |
| 2009/0161958 | A1 | 6/2009 | Markiewicz et al. |
| 2011/0320978 | A1 | 12/2011 | Horodezky et al. |
| 2012/0032877 | A1 | 2/2012 | Watkins, Jr. et al. |
| 2012/0117506 | A1 | 5/2012 | Koch et al. |
| 2012/0293424 | A1 | 11/2012 | Dai et al. |
| 2013/0006639 | A1 | 1/2013 | Kristensson et al. |
| 2013/0120305 | A1 | 5/2013 | Yasui |
| 2014/0040733 | A1 | 2/2014 | Colley |
| 2015/0193141 | A1 | 7/2015 | Goldsmith et al. |
| 2015/0212731 | A1 | 7/2015 | Karafiat |
| 2017/0249293 | A1 | 8/2017 | Couelier |
| 2017/0249505 | A1 | 8/2017 | Couelier et al. |

FOREIGN PATENT DOCUMENTS

| | | |
|---|---|---|
| JP | 2011065623 A | 3/2011 |
| WO | 2014/174219 A1 | 10/2014 |

OTHER PUBLICATIONS

Shilman, Michael et al. CueTIP: A Mixed-Initiative Interface for Correcting Handwriting Errors. Proceedings for the 19th Annual ACM Symposium on User Interface Software and Technology, Jan. 1, 2006, pp. 323-332.

International Search Report and Written Opinion of the International Searching Authority dated May 8, 2017, International Application No. PCT/EP2017/054404, pp. 1-16.

International Search Report and Written Opinion of the International Searching Authority dated May 8, 2017, International Application No. PCT/EP2017/054401, pp. 1-15.

Non-Final Office Action dated Sep. 21, 2017, U.S. Appl. No. 15/192,252, pp. 1-35.

Joel Couelier et al., "Method and System for Character Insertion in a Character String", U.S. Appl. No. 15/192,252, filed Jun. 24, 2016, pp. 1-34.

Joel Couelier et al., "A Method for Inserting Characters in a Character String and a Corresponding Digital Device", U.S. Appl. No. 15/217,697, filed Jul. 22, 2016, pp. 1-41.

Final Office Action dated May 17, 2018 in U.S. Appl. No. 15/192,252, 18 pages.

Office Action dated Jun. 12, 2018 in U.S. Appl. No. 15/217,697, 16 pages.

Notice of Allowance issued in corresponding U.S. Appl. No. 15/192,252 dated May 8, 2019, pp. 1-30.

Non-Final Office Action issued in corresponding U.S. Appl. No. 15/192,252 dated Sep. 28, 2018, pp. 1-12.

Notification of Reason for Refusal issued in corresponding Korean Patent Application No. 20157033490A dated Jul. 23, 2020, pp. 1-11 (including English Translation).

Communication Pursuant to Article 94(3) EPC issued in corresponding European Patent Application No. 14729384.9 dated Aug. 20, 2020, pp. 1-50 (including English Translation).

Notice of Reasons for Refusal issued in corresponding Japanese Patent Application Mo. 2016-509531 dated Jan. 16, 2018, pp. 1-12 (including English Translation).

Written Opinion issued in corresponding Japanese Patent Application No. 2016-509531 dated Jun. 22, 2018, pp. 1-8 (including English Translation).

Third Office Action issued in corresponding Chinese Patent Application No. 201480036365.8 dated Feb. 19, 2019, pp. 1-15 (including English Translation).

Second Office Action issued in corresponding Chinese Patent Application No. 201480036365.8 dated Nov. 13, 2018, pp. 1-8 (including English Translation).

Office Action issued in corresponding Chinese Patent Application No. 201480036365.8 dated May 2, 2018, pp. 1-9 (including English Translation).

Matsuoka, Wataru, "Book that you read when you have trouble with your Android smartphone", Softbank Kabushiki Kaisha, Jan. 20, 2012,1st edition, 4 pages. (See English tranlsations of NPL Nos. 5 and 6, cited document No. 2 for portions of relevance).

Matsuoka, Wataru, "Book that you read when you have trouble with your Android smartphone", Softbank Kabushiki Kaisha, Jan. 20, 2012,1st edition, 5 pages. (See English tranlsations of NPL Nos. 5 and 6, cited document No. 2 for portions of relevance).

Matsuoka, Wataru, "Book that you read when you have trouble with your Android smartphone", Softbank Kabushiki Kaisha, Jan. 20, 2012,1st edition, 8 pages. (See English tranlsations of NPL Nos. 5 and 6, cited document No. 2 for portions of relevance).

FIG.10

| TB3 | DG | LC | PN | ID | |
|---|---|---|---|---|---|
| hello | DG7 | $LC7=\begin{pmatrix}C71\\C72\\C73\\C74\end{pmatrix}$ | $PN7=\begin{pmatrix}PN71\\PN72\\PN73\\PN74\end{pmatrix}$ | ID7 | — GD7 |
| how | DG8 DG9 | $LC9=\begin{pmatrix}C91\\C92\\C93\end{pmatrix}$ | $PN9=\begin{pmatrix}PN91\\PN92\\PN93\end{pmatrix}$ | ID9 | — GD9 |
| are | DG10 | $LC10=\begin{pmatrix}C101\\C102\\C103\end{pmatrix}$ | $PN10=\begin{pmatrix}PN101\\PN102\\PN103\end{pmatrix}$ | ID10 | — GD10 |
| you | DG11 | $LC11=\begin{pmatrix}C111\\C112\\C113\\C114\end{pmatrix}$ | $PN11=\begin{pmatrix}PN111\\PN112\\PN113\\PN114\end{pmatrix}$ | ID11 | — GD11 |
| today | DG12 DG13 DG14 DG15 DG16 | $LC16=\begin{pmatrix}C161\\C162\\C163\\C164\end{pmatrix}$ | $PN16=\begin{pmatrix}PN161\\PN162\\PN163\\PN164\end{pmatrix}$ | ID16 | — GD16 |

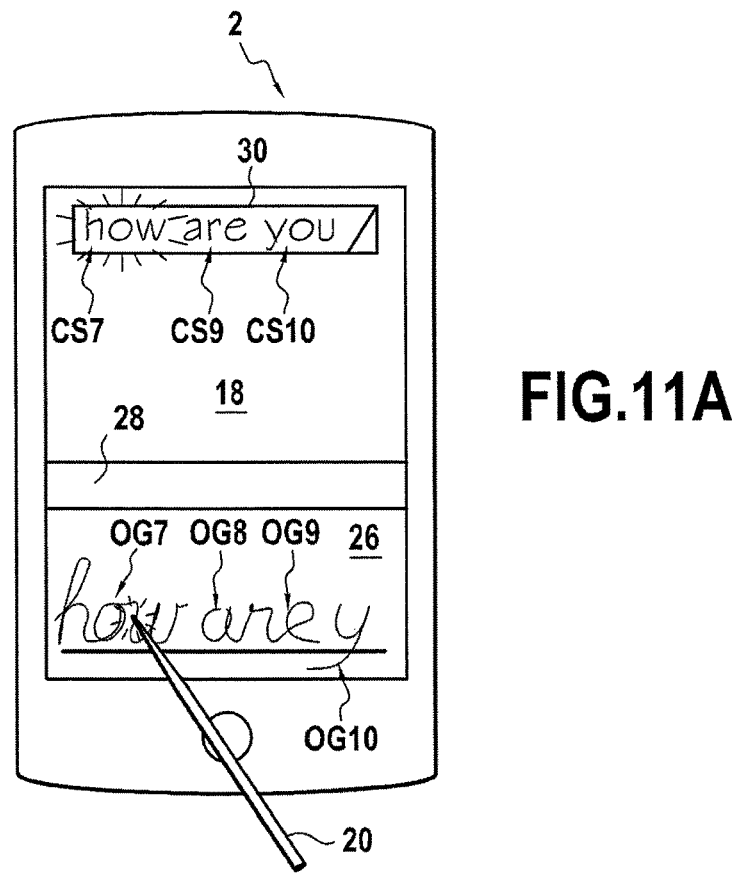

FIG.11A

FIG.11B
FIG.11C
FIG.11D
FIG.11E
FIG.11F
FIG.11G

PERMANENT SYNCHRONIZATION SYSTEM FOR HANDWRITING INPUT

CROSS-REFERENCE TO RELATED APPLICATIONS

This application is a U.S. National Stage application of International Application No. PCT/FR2014/050991 filed 24 Apr. 2014, which claims priority to French Application No. 1353746 filed 24 Apr. 2013, the entire disclosures of which are hereby incorporated by reference in their entireties.

BACKGROUND OF THE INVENTION

The present invention relates to a user inputting graphics objects into a touch screen device, and it relates more particularly to converting the graphics objects into strings of symbols by using a system for providing permanent synchronization, also referred to as "persistent" synchronization.

The invention relates more particularly to a device and a method for recognizing graphics objects (e.g. handwriting) that have been input manually by a user, and then for converting the recognized graphics objects into corresponding strings of symbols, such as alphanumeric symbols, for example.

The development of capacitive touch screens is one of the key factors behind the major growth that has been encountered over the last few years in smart phones. Unlike resistive screens, capacitive screens make it possible both to use a stylus and to use fingers. The use of styluses has also opened up a range of opportunities in the field of systems for handwriting on a touch screen.

Handwriting is a natural mental exercise for humans, but it presents difficulties from the point of view of a machine, since the machine cannot learn to read, properly speaking. The machine needs to detect those portions of the touch screen over which the user has passed a stylus or a finger, and then to deduce therefrom by means of a complex process, the digital symbols that have the greatest probability of corresponding to the user's input.

In known manner, handwriting input systems can be used at present on touch screen devices for the purpose of converting handwriting into writing that is said to be "digital", i.e. made up of strings of characters (or symbols) generated by the device. For this purpose, the system needs to recognize the graphics objects that are input manually by the user (using a stylus or a finger, for example) and to transcribe them into digital symbols.

Nevertheless, transcribing handwriting into digital writing still presents numerous challenges that have not yet been solved. In particular, the increasing miniaturization of touch appliances that can perform this type of conversion (mobile telephones, . . . ) makes it necessary to adapt present day methods of input and recognition since they can no longer be applied in the same way as they are applied on touch screens of large size (e.g. large tablets or laptop computers). Furthermore, present systems do not provide functions that are satisfactory in terms in particular of navigating through text that has already been input by the user, or indeed in terms of editing that text.

There therefore exists a need for a solution that enables graphics objects to be input for the purpose of converting them into digital symbols, and more particularly for a corresponding device and method that make it possible to input and possibly also to edit graphics objects in order to enter strings of symbols into an entry field of an application that is executing on the device.

OBJECT AND SUMMARY OF THE INVENTION

To this end, the present invention provides an input device suitable for being used by a user to input symbols into an entry field of an application that is executable on said device, the device comprising:
  an interface unit having a touch screen, the interface unit enabling graphics objects to be input manually and displayed in an input zone of said screen; and
  a graphics object processor module, the processor module comprising, for the purpose of processing each current graphics object:
    a detection unit for detecting a start of input and an end of input of said current graphics object in said input zone;
    a storage unit suitable, on detecting a start of input of the current graphics object, for storing graphics data corresponding to the current graphics object throughout the time it is being input;
    a recognition unit configured to generate from said graphics data a list of candidate strings, each having at least one symbol, each of the candidate strings being associated with a pertinence value representative of the pertinence of said candidate string relative to said graphics data; and
    an insertion unit configured to insert into the entry field a string selected by the user from the list or, by default, a string selected from the candidate strings as a function of their pertinence.

In a particular embodiment, the storage means are configured to store in association with the graphics data, the candidate strings and their associated pertinence values, together with an identifier of the selected string, said association forming a first data group, and being configured to conserve said first data group in memory for a first predetermined duration.

In a particular embodiment, the first data group is conserved in memory during the first predetermined duration that extends at least as far as inputting a subsequent graphics object, or in a particular embodiment, until the end of inputting a subsequent graphics object.

In a particular embodiment, the first data group is conserved in memory at least until the processor unit has started processing a subsequent graphics object.

In a particular embodiment, the first data group is conserved until the processor module detects a signal indicating the end of a graphics object being input.

This storage serves to maintain a permanent connection between the various items of data constituting each data group, namely: the graphics data, the candidate strings, the associated pertinence values, and the selected string (or at least its identifier). Maintaining this connection (or association), including while inputting subsequent graphics objects, makes it possible in coherent manner to conserve all of the pertinent data of the input, e.g. in order to enable it to be used subsequently, in particular in the context of navigating or editing, as defined in greater detail below.

In a particular embodiment, said first data group is configured to maintain a permanent connection between the graphics data, the candidate strings, the associated pertinence values, and the selected string so that, in response to a modification of said graphics data, the recognition unit modifies the candidate strings and the associated pertinence values stored in said first data group, and the insertion unit modifies said inserted string stored in said first data group.

In a particular embodiment, the insertion unit is configured to respond to a predetermined command by replacing said selected string in the entry field with another candidate string selected by the user from among said list of candidate strings after the selected string has been inserted in said entry field.

Advantageously, by conserving the first data group in memory for the first predetermined duration, it is thus possible subsequently to correct said selected string in the entry field. For example, if the user realizes that the candidate string that was initially inserted in the entry field (either automatically or as selected by the user) is not appropriate, the user can correct this error in the entry field later on by replacing therein the initially selected string with another candidate string as selected by the user (or by the system) from the list of candidate strings conserved in memory in the first data group.

In a particular embodiment, the processor module is configured so that the touch screen displays the list of candidate strings in an order of decreasing pertinence as determined from said pertinence values.

In a particular embodiment, the insertion unit is configured to insert said most pertinent string in the entry field, the insertion unit being configured, where applicable, to replace said most pertinent string in the entry field with another candidate string as selected by the user by means of the interface unit.

In a particular embodiment, the interface unit is configured, when the end of input of the current graphics object has been detected and if no subsequent start of input of a graphics object has been detected within a predetermined length of time starting from said detection of the end of input, to shift the display of the current graphics object in the input zone so as to release space in said input zone for inputting a subsequent graphics object.

In a particular embodiment, the predetermined length of time is a function of the position of the current graphics object in the input zone.

In a particular embodiment, the predetermined length of time is a function of the total length of the trace along the main input axis of the graphics objects being displayed in the input zone.

In a particular embodiment, the interface unit is configured, once said shifting has been performed, to display a graphics indicator in the input zone to define a region of the input zone adjacent to the current graphics object. If the detection unit detects the start of input of a subsequent graphics object in said region, the storage unit is configured to store the graphics data of the subsequent graphics object throughout the time it is being input in association with the graphics data of the first data group.

In a particular embodiment, the interface unit is configured, once said shifting has been performed, to display a graphics indicator in the input zone to define a region of the input zone adjacent to the current graphics object. If the detection unit detects a start of input of a subsequent graphics object outside said region, the storage unit is configured to store the graphics data of the subsequent graphics object throughout the time it is being input in a second data group independent of said first data group.

In a particular embodiment, if the interface unit detects the start of the subsequent graphics object being input outside said region of the input zone, the insertion unit confirms said selected string.

In a particular embodiment, the processor module is configured, after a second predetermined duration measured from said confirmation, to cause the current graphics object to be displayed in block characters, the storage means conserving said first data group in memory during said first predetermined duration.

By way of example, the graphics indicator represents an empty space in the input zone between the current graphics object and an unused portion of the input zone.

In a particular embodiment, the symbols in each of said strings of characters comply with the Unicode standard.

In a particular embodiment, each said graphics object represents a handwritten symbol.

In a particular embodiment, the processor module is configured to respond to a first predetermined interaction of the user with said device to display in the entry field at least any one of said previously inserted strings that was no longer being displayed in the entry field at the time of said first interaction.

The processor module may also be configured to display in said input zone at least a portion of a graphics object corresponding to one of said strings that said first predetermined interaction has caused to be displayed in the entry field.

In a particular aspect of the invention, the processor module is configured so that said first predetermined interaction is performed by the user pressing a point of contact against the touch screen in the entry field and moving said point of contact so as to trigger scrolling of said strings in the entry field until the desired string is displayed.

In a particular aspect of the invention, the processor module is configured to cause graphics objects to be displayed in real time in the input zone in correspondence with said scrolling imparted by moving the contact point.

In a particular aspect of the invention, the processor module is configured so that said first predetermined interaction is performed by the user pressing a point of contact against the touch screen in a scroll bar displayed on the touch screen and moving said point of contact along said scroll bar in order to cause said strings to scroll in real time in the entry field until the desired string is displayed.

In a particular embodiment, the processor module is configured to respond to a second predetermined interaction of the user with said device to display in the input zone at least any one of the previously input graphics objects that is no longer being displayed in the input zone at the time of said second predetermined interaction.

The processor module may also be configured to display in the entry field at least a portion of a said selected string corresponding to one of said graphics objects caused to be displayed in the input zone by said second predetermined interaction.

In a particular aspect of the invention, the processor module is configured so that said second predetermined interaction is performed by the user pressing a point of contact against the touch screen in the input zone and moving said point of contact so as to cause graphics objects to scroll in real time in the input zone until the desired graphics object is displayed.

In a particular aspect of the invention, the processor module is configured to cause said selected string to be displayed in real time in the entry field in correspondence with said scrolling imparted in the input zone by the movement of the point of contact.

In a particular embodiment, the processor module is configured, during said scrolling in the entry field, to cause a marker to be displayed to identify an "active" string that can be edited by the user.

In a particular embodiment, the processor module is configured so that when the user inputs a new graphics object overwriting a previously input graphics object that is being displayed in the input zone it updates the stored data group of the previously input graphics object with the following: the graphics data of the new graphics object; the list of candidate strings together with the associated pertinence values generated by the recognition unit for the new graphics object; and the string selected by the insertion unit for the new graphics object.

In a particular embodiment, the processor module is configured to enable the user to use the interface unit to edit a string being displayed in the entry field, the data group of said edited string being modified in response to said editing by the processor module and stored by the storage means.

In a particular aspect of the invention, in order to edit a graphics object, the processor module enables the user to use the touch screen to select said graphics object for editing.

By way of example, this selection may be performed by pressing a point of contact against the touch screen on the graphics object to be edited, said selection causing the corresponding string inserted in the entry field to be selected as the active string.

In a particular embodiment, the processor module is configured to respond to a third predetermined interaction of a user with said device by inserting space between two graphics objects being displayed in the input zone.

In a particular embodiment, the recognition unit is configured to start generating said list of candidate strings of at least one symbol as from detecting a start of the current graphics object being input.

In a variant embodiment, the recognition unit is configured to generate said list of candidate strings of at least one symbol on detecting an end of the current graphics object being input.

The present invention also provides an input method performed by an input device suitable for being used by a user to enter symbols into an entry field of an application that can be executed on said device, the device comprising an interface having a touch screen, the interface enabling graphics objects to be input manually and displayed in an input zone of the screen, the method comprising processing of graphics objects, said processing comprising for each current graphics object:

detecting a start and an end of said current graphics object being input in said input zone;

on detecting a start of the current graphics object being input, storing graphics data corresponding to said current graphics object throughout the time it is being input;

generating a list of candidate strings of at least one symbol from said graphics data, each of said candidate strings being associated with a pertinence value representative of the pertinence of said candidate string relative to said graphics data; and inserting in said entry field a said string as selected by the user from said list, or by default a said string selected from among the candidate strings as a function of its pertinence.

In a particular implementation, the method comprises storing in memory, in association with the graphics data, the candidate strings and their associated pertinence values, together with an identifier of the selected string, said association forming a first data group, and conserving said first data group in memory during a first predetermined duration.

In the ambit of the invention, it is also possible to envisage variants of the input method that are analogous to the embodiments and variants mentioned above with reference to the input device of the invention.

In a particular implementation, the various steps of the input method are determined by computer program instructions.

Consequently, the invention also provides a computer program on a data medium (or storage medium), the program being suitable for being performed in an input device or more generally in a computer, the program including instructions adapted to perform steps of an input method as defined above.

The program may use any programming language, and be in the form of source code, object code, or code intermediate between source code and object code, such as in a partially compiled form, or in any other desirable form.

The invention also provides a data medium (or a storage medium) that is readable by an input device, and more generally by a computer, the medium including instructions of a computer program as mentioned above.

The data medium may be any entity or device capable of storing the program. For example, the medium may comprises storage means such as a read only memory (ROM), e.g. a compact disk (CD) ROM or a microelectronic circuit ROM, or indeed magnetic recording means, e.g. a floppy disk or a hard disk.

Furthermore, the data medium may be a transmissible medium such as an electrical or optical signal suitable for being conveyed via an electrical or optical cable, by radio, or by other means. The program of the invention may in particular be downloaded from an Internet type network.

Alternatively, the data medium may be an integrated circuit in which the program is incorporated, the circuit being adapted to execute or to be used in the execution of the method in question.

BRIEF DESCRIPTION OF THE DRAWINGS

Other characteristics and advantages of the present invention appear from the following description made with reference to the accompanying drawings which show an embodiment having no limiting character. In the figures:

FIGS. 9A, 9B, and 11A are diagrams showing an example input device operating in a third implementation of the invention;

FIG. 10 is in the form of a table and shows data groups stored by the input device of FIGS. 9A and 9B; and FIGS. 11B to 11G are diagrams showing examples of how editing functions are implemented by the input device of the invention.

DETAILED DESCRIPTION OF SEVERAL EMBODIMENTS

The present invention relates to converting graphics objects input by a user into strings of symbols, and it relates more particularly to a device and to a method for recognizing graphics objects (e.g. handwriting) as input manually by a user, and then on the basis of this recognition for converting the graphics objects into corresponding strings of symbols, such as alphanumeric symbols, for example.

In this document, implementations of the invention are described in the context of converting handwriting into strings of symbols in Unicode. Nevertheless, the invention may be applied to converting other types of graphics objects input by a user, for the purpose of obtaining symbols (or characters) in any format.

Figure 1A:
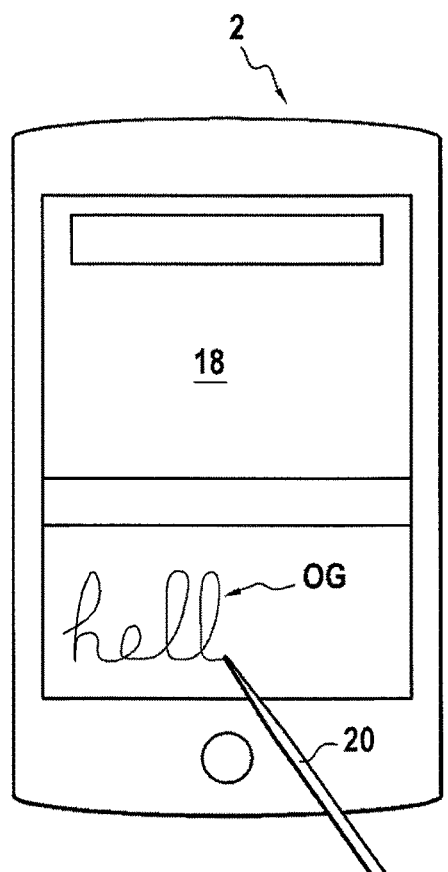
FIGS. 1A and 1B are diagrams of an input device in a particular embodiment of the invention.
Figure 1B:
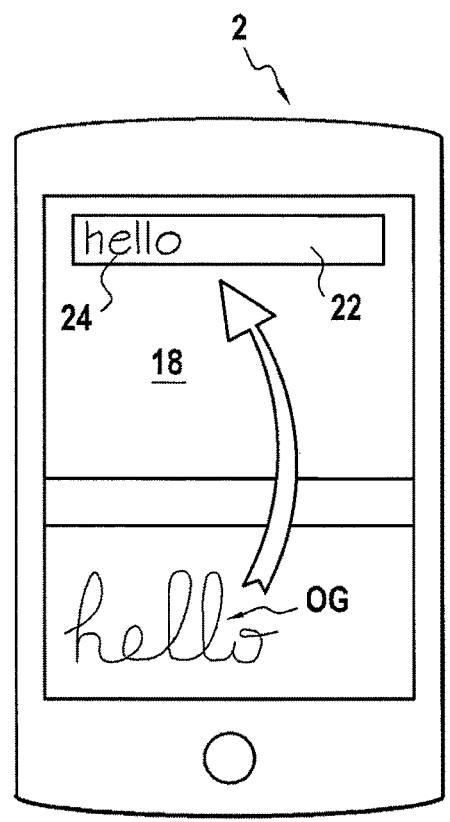

FIGS. 1A and 1B are diagrams showing an input device 2 in a first particular embodiment of the invention. In substance, the device 2 described in this example is a mobile telephone having a touch screen 18. The user uses a stylus 20 (or alternatively a finger, for example) to input a graphics object OG in the bottom portion of the touch screen 18. In this example, the graphics object corresponds to handwriting (the word "hello").

The input device 2 is configured to recognize the graphics object OG as input manually by the user, and then to insert a corresponding string of symbols 24 into an entry field 22, which string is obtained by performing said recognition. In this example, the entry field 22 constitutes the field of an application being executed by the device 2. By way of example, the entry field 22 may be the entry field of an application (such as a search engine) in an Internet browser, or indeed the entry field of a messaging application (e.g. for sending a short message service (SMS)).

It can be understood that the input device 2 may be in the form of any appliance (portable or otherwise) having a touch screen and suitable for converting such graphics objects into digital symbols (tablets, personal digital assistants (PDAs), . . . ).

Furthermore, a said string of symbols (or characters) may comprise one or more symbols, the symbol(s) representing one or more graphics objects input by the user.

Figure 2:
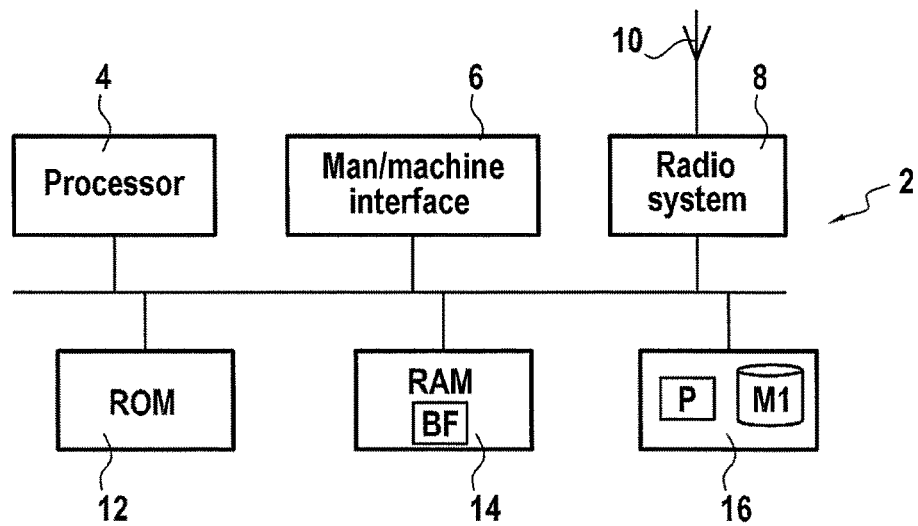
FIG. 2 is a diagram of the hardware architecture of an input device in accordance with a particular embodiment of the invention.

FIG. 2 is a diagram showing the hardware architecture of the input device 2 in the first embodiment of the invention. More particularly, the device 2 comprises in particular a processor 4, an interface unit 6, a radio system 8 connected to a radio antenna 10, a ROM 12, a rewritable volatile memory or "random access memory" (RAM) 14, and a rewritable non-volatile memory 16. A bus provides communication between these components.

The device 2 may also have ports and other conventional components that are not relevant to describing the invention and presenting characteristics and operations that are therefore not described in this document.

In the presently-envisaged example, the rewritable non-volatile memory 16 is a flash type memory. Nevertheless, it should be understood that other types of rewritable non-volatile memory could be envisaged by the person skilled in the art, such as NAND flash type memory, for example.

In this example, the rewritable non-volatile memory 16 constitutes a data medium in accordance with the invention that is readable by the processor 4, and that stores a computer program P in accordance with the first embodiment of the invention. This program P includes instructions for executing steps of an input method of the invention. The main steps E2 to E18 of the method are shown, in a preferred embodiment of the invention, in FIG. 5 that is described below.

The memory 16 comprises a memory unit M1 for a purpose that is described in greater detail below.

The interface unit 6 constitutes a man/machine interface enabling a user to input graphics objects manually, and also serving to display these graphics objects on the device 2. More generally, the interface unit 6 enables the user to control the device 2. This interface unit 6 has a touch screen 18 and may also have loudspeakers, mechanical keys, and/or any other means for performing any man/machine interaction.

The RAM 14 may in particular store data in a buffer memory BF while executing the input method of the invention. The use of this buffer memory BF is described in greater detail below.

In a variant embodiment, all of the memories used in the device are of the flash type.

In this example, the radio system 8 enables the mobile telephone 2 to communicate in conventional manner, e.g. using the third generation or the fourth generation (3G or 4G) standard. The radio portion is nevertheless not necessary for performing the invention and is not described in greater detail below in this document.

The first embodiment of the invention is described in greater detail below with reference to FIGS. 2 to 5. More precisely, the input device 2 performs the input method of the invention by executing the program P.

In this first embodiment, the touch screen 18 of the device 2 comprises (FIG. 3A):
an input zone 26 into which the user can input graphics objects manually, e.g. using a stylus 20 and/or a finger;
a display zone 28 suitable for displaying candidate strings of symbols as generated by the device 2; and
the entry field 30 as described above in which the device 2 inserts symbols corresponding to the graphics objects input by the user into the input zone 26.

In this example, the input zone 26 includes an optional base line 32 informing the user where to write on the touch screen 18.

In this embodiment, the processor 4 comprises:
a detection unit;
a storage unit;
a recognition unit; and
an insertion unit.

In this example, the units are implemented by the same processor 4 in co-operation with the other components of the device 2 in order to perform an input method in the first implementation of the invention. Other implementations of the invention can nevertheless be envisaged.

The processor 4 in this example constitutes a processor module in the meaning of the invention.

Figure 3A:
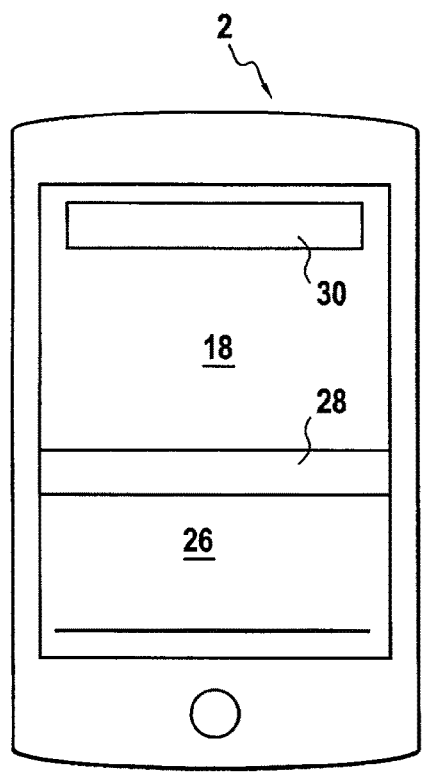
FIGS. 3A to 3F are diagrams showing an input device at various steps in the performance of an input method in accordance with a first implementation of the invention.
Figure 3B:
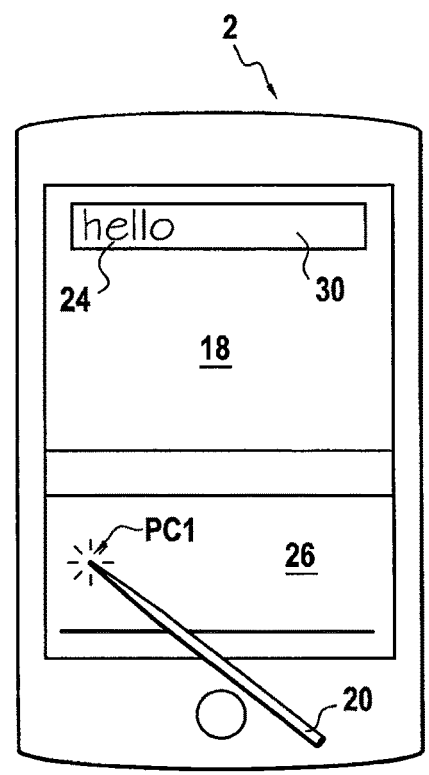

In FIG. 3B, the user starts by inputting text into the input zone 26 by using the stylus 20. The detection unit of the device 2 is suitable for detecting the start and the end of graphics objects being input into the input zone 26.

During a step E2, the device 2 (i.e. its detection unit) detects the point of contact PC1 applied by the user by means of the stylus 20 in the input zone 26 of the touch screen 18. The event of detecting the stylus making contact on the portion 26 of the touch screen (which event is referred to below in this document as "pen down") triggers processing by the device 2 of the first current graphics objects, referenced OG1.

Figure 3C:
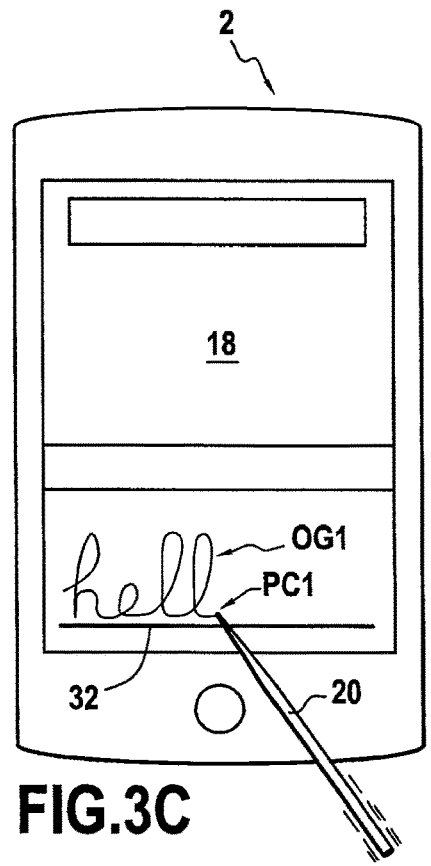

In this example, the user writes the word "hello" by hand in the input zone 26 by sliding the tip of the stylus 20 over the base line 32 (FIG. 3C). The detection unit of the device 2 detects (E4) the point of contact PC1 sliding in the input zone 26.

Throughout input, the device 2 (i.e. its storage unit) stores (E4) graphics data DG1 corresponding to the graphics object OG1 being input.

In general manner, the graphics data that can be generated by the device 2 (i.e. the processor module 4) while executing the input method are representative of "digital ink" deposited by the user in the input zone 26. By way of example, the graphics data DG1 corresponds to the various physical coordinates of the sliding point of contact PC1 throughout input. These graphics coordinates may take account of other information, such as the force with which the user presses against the touch screen 18, for example. The language and the format used for the graphics data may be arbitrary.

Figure 3D:
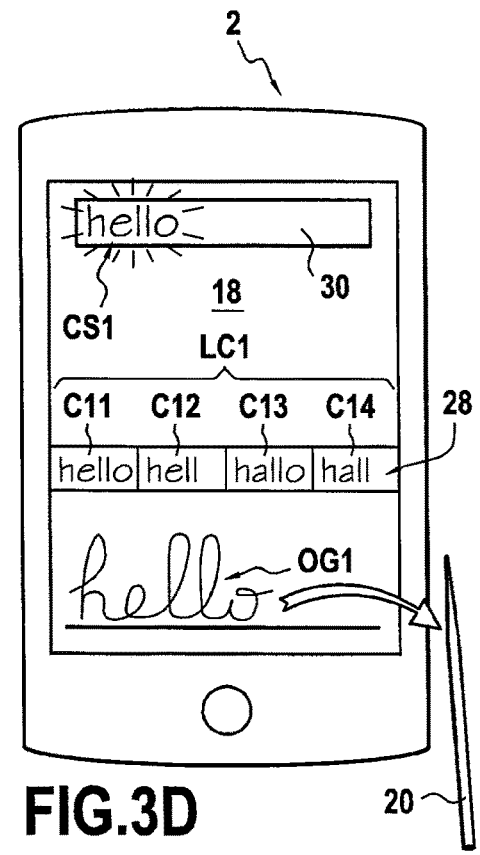

In this example, the graphics data DG1 of the object OG1 is stored in real time in the buffer memory BF. This storing of data continues until a "pen up" event is detected (E6) by the detection unit (FIG. 3D). A "pen up" event occurs when the device 2 detects the end of a current graphics object (OG1 in this example) being input, this end of input being representative of the disappearance of the point of contact (PC1 in this example) from the input zone 26. In this example, this end of input is the result of the user lifting the stylus 20.

On detecting the end of the graphics object OG1 being input, the device 2 (i.e. the recognition unit) performs recognition processing (E8) on the graphics data DG1 (stored in this example in the buffer memory BF) and generates (E10) a list LC1 of candidate strings of symbols C11 to C14 from said graphics data DG1.

As explained in greater detail below, alternative implementations can be envisaged in which above steps E8 and E10 are triggered on detecting the start (and not the end) of the current graphics object being input, i.e. on detecting the point of contact PC1 at the start of inputting the graphics object OG1 in the present example.

During the step E10, each candidate string C11-C14 (each comprising at least one symbol) is selected by the device 2 for the closeness of its match with the graphics object OG1 input manually by the user. Such recognition techniques are already known at present and are therefore not described in detail in this document.

Each of the candidate strings C11-C14 generated by the recognition unit is associated with a respective pertinence value PN11-PN14 (referred to collectively as PN1) representative of the pertinence of the candidate string relative to the graphics data DG1. These pertinence values generated by the recognition unit enable the most pertinent candidate string to be identified, and where appropriate, to classify the candidate strings C11-C14 in their order of pertinence.

In this example, the device 2 displays (E12) the list LC1 of candidate strings C11 to C14 in the display zone 28. Although not essential, the display is preferably made in an order of decreasing pertinence (e.g. from left to right; C11 in this example being the most pertinent string and C14 the least pertinent string) in the zone 28 (FIG. 3D). Classification in decreasing order of pertinence is performed on the basis of the pertinence values PN11 to PN14, and it is naturally possible to envisage other examples of classification.

The number of candidate strings may vary depending on the detected graphics object and on the recognition technique used. Each list of candidate strings comprises at least one candidate string.

The device 2 (i.e. its insertion unit) is configured to insert (E14) into the entry field 30 a string that the user has selected from the candidate strings in the list LC1, or by default a string that is selected automatically from the candidate strings C11-C14 as a function of their pertinence (FIG. 3D). In this embodiment, if the user does not make a selection, the device 2 automatically selects the candidate string that is the most pertinent (e.g. for which the associated pertinence value is the greatest).

In a particular embodiment, the device 2 is also configured, where appropriate, to replace the most pertinence string (as selected by default by the device 2) in the entry field 30 by some other string as selected subsequently from the list LC1 by the user making use of the interface unit 6.

Selection and insertion E14 are performed in this example after detecting the end of the current graphics object being input (pen up). Nevertheless, it is possible to envisage triggering these operations even before detecting the end of input in the alternative possibility where recognition processing and the generation of candidate strings are triggered before detecting the end of the current graphics object being input (i.e. before detecting pen up).

In this example, the device 2 automatically inserts the string of characters "h", "e", "l", "l", "o" corresponding to the graphics object OG1 input by the user in the form of handwriting.

The device 2 (i.e. the storage unit) is also configured to store (E16) the graphics data DG1 in association with:
the list LC1 of candidate strings C11-C14;
the list PN1 of pertinence values PN11-PN14 associated respectively with the candidate strings C11-C14; and
an identifier ID1 of the string CS1 as selected and inserted in the entry field 30.

The identifier ID1 may be of any format. In one particular implementation, the identifier of a selected string (ID1 in this example) is the selected string itself (SC1 in this example). Alternatively, the identifier ID1 may be a determined code identifying the selected string SC1. By way of example, this identifier may identify the position of the selected code in the list LC1 ($1^{st}$, $2^{nd}$, $3^{rd}$, or $4^{th}$ position in the present example). The use of an identifier in the data group serves to limit the volume of data that needs to be stored by the storage unit.

It should be observed that the data association [DG1; LC1; PN1; ID1] constitutes a first data group GD1 (or data vector). This data association GD1 is represented in the form of a table TB1 in FIG. 4A.

In a particular embodiment, the device 2 is configured to conserve (E16) this first data group GD1 in memory for a first predetermined duration DP1. This first predetermined duration DP1 may for example be set in advance by the user or by the designer of the device. Where appropriate, the duration DP1 may be selected so that it varies as a function of certain parameters, e.g. such as the type of language in use or the identity of the user. The duration DP1 is preferably selected in such a manner as to limit the memory resources needed for implementing the invention, while keeping the data group in memory long enough to make it possible for it to be used subsequently (e.g. for consultation, editing).

In a particular example, the predetermined duration DP1 is selected so as to be infinite (i.e. storage is permanent in the device).

In this example, storage E16 takes place in the memory M1. This storage may initially be performed in the memory 14 (e.g. in the buffer memory BF) and then the data group GD1 may be transferred into the memory M1.

Once the processing of the current graphics object OG1 has been completed, the device determines (E18) whether the user is starting to input a new graphics object. To do this, the detection unit determines whether a "pen down" event occurs in the input zone 26. If so, the device 2 restarts processing at step E4. Otherwise, processing comes to an end.

Storing GD1 makes it possible to maintain a permanent connection between the data making up the data group GD1, namely: the graphics data, the candidate strings, the associated pertinence values, and the selected string (or at least its identifier). Maintaining this connection (or association), including while subsequent graphics objects are being input, makes it possible to conserve in consistent manner all of the pertinent data that is input.

Because of this permanent connection, the recognition unit is capable, e.g. in response to a later modification of the graphics data GD1, of modifying accordingly the list LC1 of candidate strings and the list PN1 of associated pertinence values, and the insertion unit can modify the string CS1 accordingly. Thus, in response to the graphics data GD1 being modified, the data group GD1 stored by the storage unit can be updated in appropriate manner. As explained in greater detail below, this permanent connection makes it possible to edit the user's previous input.

The first predetermined duration DP1 is thus preferably selected so as to ensure that the data group for the current graphics object is conserved in memory during (or until the end of) inputting of one or more subsequent graphics objects (assuming that graphics objects continue to be input).

In a particular example, the first predetermined duration DP1 is selected so that the data group of the current graphics object is conserved in memory at least until a subsequent graphics object is input, or more precisely until the end of inputting a subsequent graphics object.

In a particular example, the first predetermined duration DP1 is selected so that the data group of the current graphics object is conserved in memory at least until the processor unit initiates processing of a subsequent graphics object.

In a particular embodiment, the first data group is conserved until the processor module 4 detects a signal indicating the end of graphics objects input.

It is thus possible to conserve the data group in memory until the end of the user inputting all of the graphics objects (i.e. until the user finally confirms the input or until the application having the entry field 30 is closed).

As also explained below, this permanent connection makes it possible to navigate in intelligent manner in the entry field and in the input zone in order to consult (and possibly edit) the user's previous inputs.

In a particular embodiment, the insertion unit is configured to respond to a predetermined command by replacing the selected field CS1 in the entry field 30 with another candidate string selected by the user from said list LC1 of candidate strings C11-C14 after said insertion of the selected string CS1 into the entry field 30.

Advantageously, conserving the first data group GD1 in memory for the first predetermined duration DP1 thus enables the selected string CS1 in the entry field 30 to be corrected subsequently. For example, if the user realizes that the candidate string that was initially inserted in the entry field 30 (either automatically or as selected by the user) is not appropriate, then the user can correct that error later on in the entry field 30 by replacing the initially selected string CS1 with another candidate string selected by the user (or by the system) from the list LC1 conserved in memory in the first data group DG1.

Figure 3E:
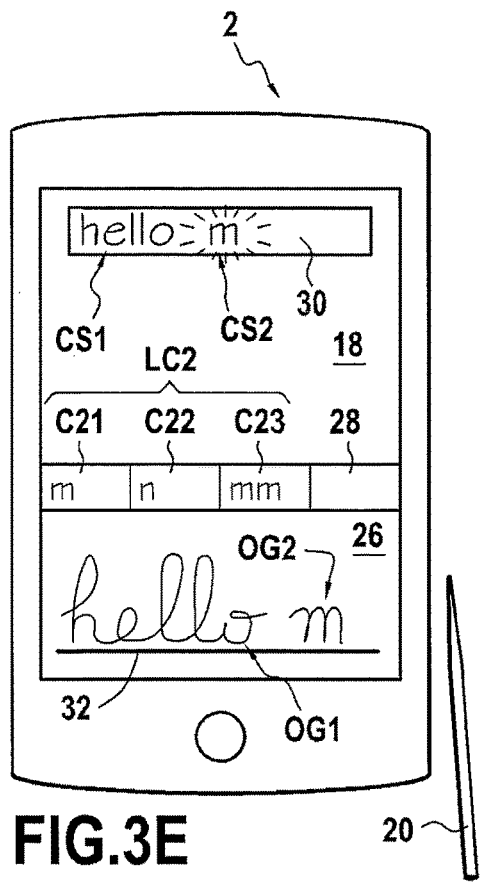

The description of this embodiment continues with reference to FIGS. 3E, 3F, 4B, and 4C. The user starts by inputting (i.e. writing) a new graphics object OG2 corresponding to the letter "m" (FIG. 3E). The device 2 then detects that the graphics object OG2 belongs to a new word distinct from the preceding graphics object OG1 (e.g. because of the spacing of OG2 apart from OG1). The graphics object OG2 is processed by executing steps E2 to E18 in the same manner as explained above with reference to the graphics object OG1.

Once the letter "m" has been formed in the input zone 26, the device 2 detects (E6) that the user has lifted the stylus (it detects a "pen up" event).

The list LC2 of candidate strings C21 to C23 is thus generated (E8 and E10) from the graphics data DG2 that has been collected for the current graphics object OG2. The device 2 displays (E12) this list LC2 in the display zone 28, and it inserts (E14) the string CS2 in the entry field 30 (in this example, the string CS2 corresponds to the candidate string C21 selected by default by the device 2). A list PN2 of pertinence values PN21-PN23 is also generated (E10) in association with the respective candidate strings C21-C23.

Figure 4A:
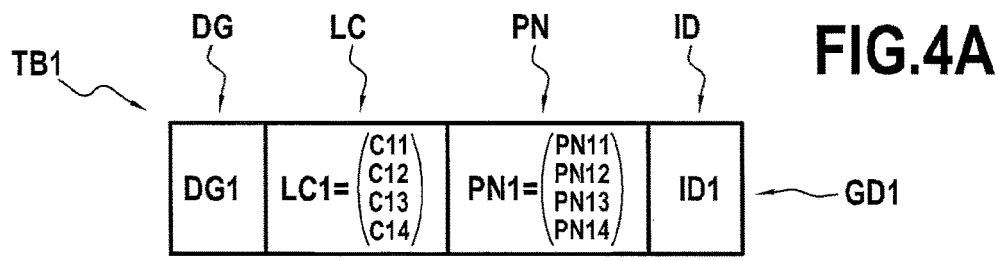
FIGS. 4A to 4C are in the form of tables showing data groups stored by the input device during different stages of performing the input method shown in FIGS. 3A-3F.
Figure 4B:
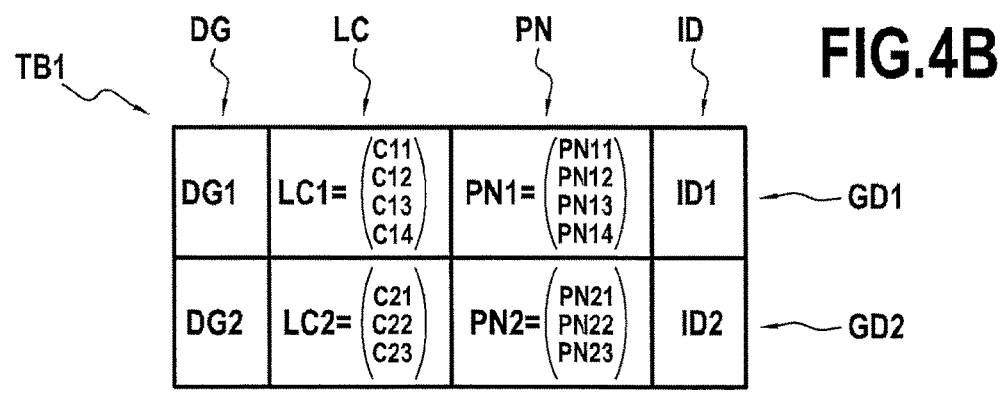

The device 2 (i.e. the storage unit) also stores (E16), as a second data group GD2, the graphics data DG2 of the graphics object OG2 in association with the lists LC2 and PN2 and with an identifier ID2 of the selected string CS2. The table TB1 in FIG. 4B represents the data groups GD1 and GD2 stored by the storage unit in the memory M1 in this example. As explained above, the identifier ID2 may be the selected string itself (e.g. C21), or a code identifying the selected string (e.g. its position in the list LC2).

It is assumed at this point that the user starts inputting the letter "y" constituting a third graphics object OG3. The device 2 detects the occurrence of a new "pen down" event resulting from a new point of contact between the stylus 20 and the input zone 26 of the touch screen 18.

In this example, the device detects that the letter "y" needs to be attached to the preceding graphics object OG2 (e.g. because of the proximity of OG3 to OG2). The current graphics object OG3 is processed by executing the steps E2 to E18 in a manner analogous to processing the preceding graphics objects OG1 and OG2.

Figures 4C, 5:
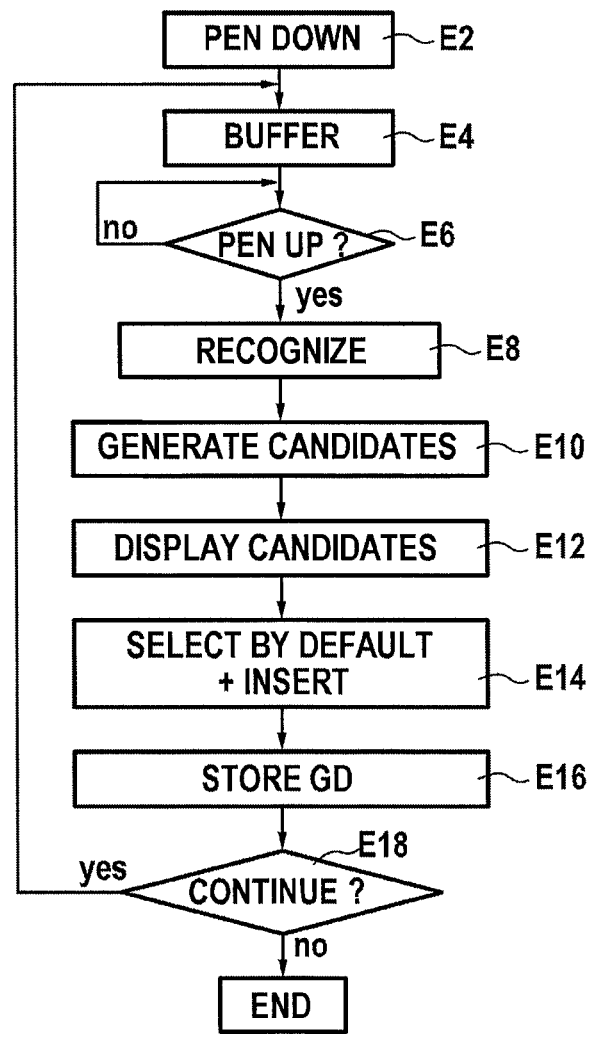
FIG. 5 is a flow chart showing the main steps of the input method in accordance with the first implementation of the invention.

Nevertheless, the processing of OG3 differs in that the device 2 (i.e. the storage unit) is configured to store the graphics data DG3 of the graphics object OG3 throughout its inputting in association with the graphics data DG2 of the second data group GD2. The data group GD2 is thus modified and renamed GD3 for reasons of clarity (FIG. 4C).

More precisely, the list LC2 of candidate strings is replaced in GD3 by a new list LC3 of candidate strings C31-C33 generated by the recognition unit. The candidate strings C31-C33 are generated from the graphics data DG2 and DG3 so as to be representative of the graphics set OG2+3 constituted by the graphics objects OG2 and OG3 (these two graphics objects together forming the word "my" in this example).

Figure 3F:
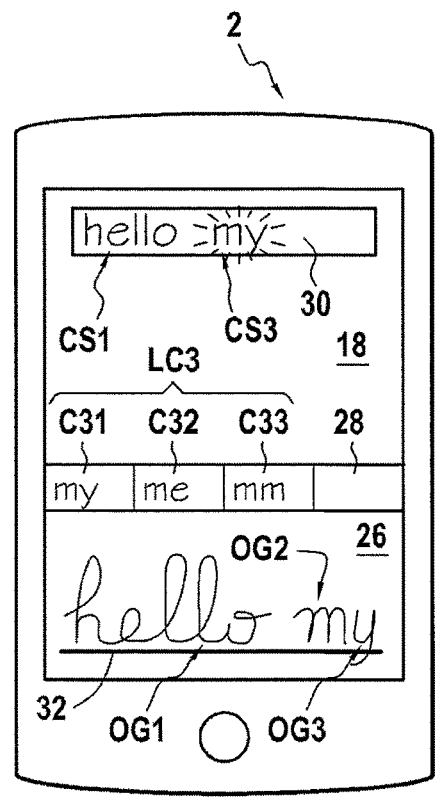

The list LC3 is displayed in the display zone 28 as shown in FIG. 3F. The pertinence values PN2 are also replaced in GD3 by a new list PN3 of pertinence values PN31-PN33 associated respectively with the candidate strings C31-C33.

The insertion unit is also configured to replace the string CS2 as previously selected with reference to OG2 by the string CS3 as selected with reference to the set OG2+3. The identifier ID2 is thus replaced in the data group GD3 by an identifier ID3 of the selected string CS3. As already explained, the identifier ID3 may be the selected string itself (e.g. C31) or it may be a code identifying the selected string (e.g. its position in the list LC3).

At the end of this input example, the symbols "h", "e", "l", "l", "o", "m", and "y" are included in the entry field 30.

As indicated above, it is possible to envisage an alternative implementation in which the steps E8 and E10 are triggered on detecting the start (and not an end) of a current graphics object being input (e.g. on detecting the point of contact PC1 at the start of inputting the graphics object OG1). In this variant implementation, the recognition unit may be configured for example to generate said list of candidate symbol strings on detecting the start of the current graphics object being input. By way of example, said recognition unit may be configured to begin recognition processing on detecting the start of the graphics object OG1 being input and then to generate the list of candidate strings. This list generation can then continue until the end of inputting the graphics object OG1 is detected. Under such circumstances, the list of candidate strings being generated can vary throughout the inputting of the current graphics object. The recognition and generation processing can thus run on continuously between detecting the start of the current graphics object being input and detecting the end of the current graphics object being input.

As mentioned above, selection and insertion E14 can also be performed prior to detecting the end of the current graphics object being input. Under such circumstances, the string that is selected and inserted in the entry field may, where appropriate, be modified during inputting of the current graphics object.

A second implementation of the invention is described below with reference to FIGS. 6A-6B, and 7A and 8.

It should be observed that in this document, unless specified to the contrary, elements that are common to two distinct implementations are given the same reference numbers and they present characteristics that are identical, so they are not described again for reasons of simplicity.

In this second implementation, the device 2 operates in similar manner to the first implementation described with reference to FIG. 5 but nevertheless differs in that additional functions are performed, namely the automatic scrolling function (or auto-scrolling), and possibly also the space-switch function, as described below.

Figure 6A:
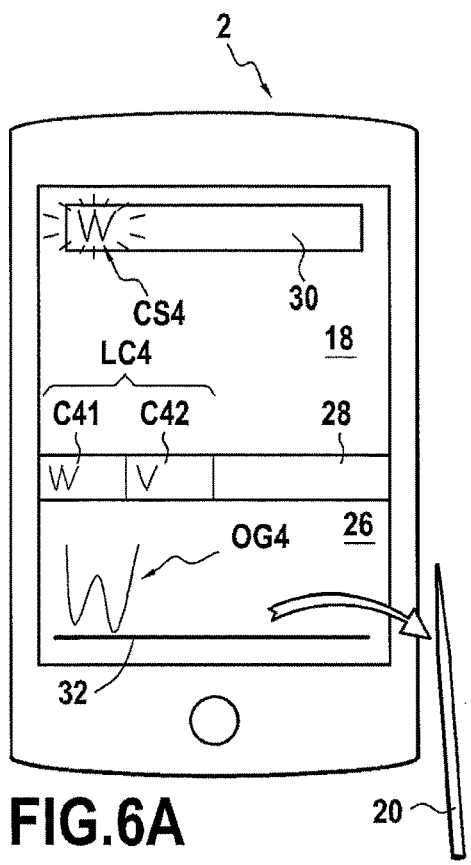
FIG. 6A to 6F are diagrams showing an input device at different steps in the performance of an input method in accordance with a second implementation of the invention.

At this point it is assumed that the user starts inputting a first current graphics object OG4 (corresponding in this example to the letter "W") in the input zone 26 (FIG. 6A).

The device 2 processes the current graphics object OG4 by executing the steps E32 to E46 in identical manner to the steps E2 to E16, respectively. In substance, on detecting the start of the graphics object OG4 being input (a "pen down" event), the storage unit stores (E34) the corresponding graphics data DG4. The recognition unit generates (E40) a list LC4 of candidate strings C41-C42. The string CS4 selected by the insertion unit is inserted (E44) in the entry field 30. In this example, the most pertinent candidate string C41 (corresponding to the letter "W") is inserted by default in the entry field 30. The recognition unit also generates a list PN4 of pertinence values PN4A-PN42 associated respectively with the candidate strings C41-C42.

The storage unit also stores (E46) the graphics data DG4 in association with the list LC4, the list PN4, and an identifier ID4 of the string CS4 included in the entry field 30 (cf. Table TB2 in FIG. 7A), this data group being referenced GD4 in the present example. By way of example, the storage unit is configured to conserve in memory this data group GD4 for the first predetermined duration DP1, as defined above. Nevertheless, it should be observed that the automatic scrolling function as described below can be implemented without it being necessary to conserve in memory the entire data group DG4 for the predetermined duration DP1 as described above.

The processing of the graphics object OG4 nevertheless differs in that, on detecting the "pen up" event at E36, the device 2 also triggers (E48) the starting of a timer TM. Running this timer makes it possible to perform a function of automatically scrolling graphics objects in the input zone 26.

More precisely, in this example, the device 2 is configured to detect (E50) whether a start of inputting a subsequent graphics object OG5 has occurred in the input zone 26 within a predetermined length of T starting from detecting the end of inputting OG4. In other words, the device 2 determines whether a "pen down" event occurs in the input zone 26 within a predetermined length of time T measured from detecting the end of inputting OG4.

If so, the device 2 continues (E52) to process the subsequent graphics object without triggering automatic scrolling in the input zone 26. This possibility is not described in greater detail in this example.

In contrast, if the result of the detection in step E50 is negative (i.e. no "pen down" is detected within the predetermined length of time T), then the device 2 triggers (E54) automatic scrolling of the graphics objects that are being displayed in the input zone 26, namely the graphics object OG4 in the present example.

This automatic scrolling is manifested by the current graphics object (i.e. OG4) and all other graphics objects that might be displayed in the input zone 26 scrolling in the input zone 26 in such a manner as to release space in the input zone 26 for inputting a subsequent graphics object.

Figure 6B:
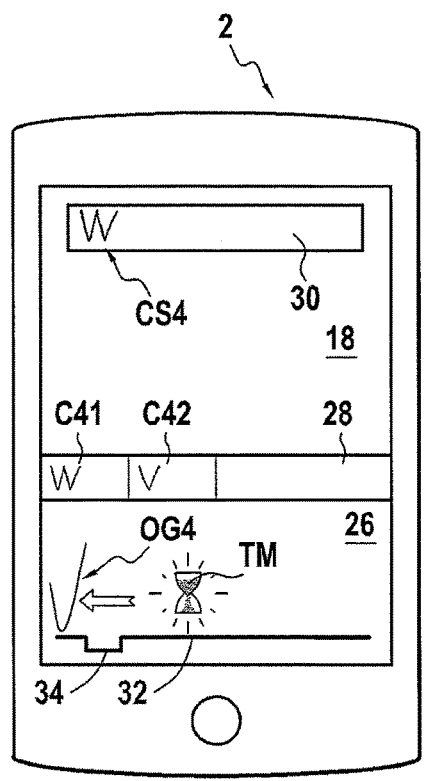

In the present example, this scrolling leads to the letter W shifting to the left of the input zone such that only the end of the letter remains visible on the screen (FIG. 6B). Other types of shifting (in particular in terms of direction or amplitude) could be envisaged.

In a particular example, the display of the input zone itself remains unchanged while performing the automatic scrolling function: it is the graphics objects that are moved through said input zone in order to release space for the purpose of inputting a subsequent graphics object. In a particular example, at least one graphics object that was being displayed in the input zone prior to the automatic scrolling is removed in full or in part from the input zone as a result of the shifting that takes place during the automatic scrolling.

The auto-scrolling function is advantageous in that it makes it possible in intuitive manner to cause graphics objects to scroll through the input zone without the user needing to actuate any particular button or switch. The length of time T may be personalized at will in order to adapt the auto-scrolling to the writing style of each user.

Auto-scrolling is performed on the basis of elapsed time starting from the last occasion the stylus was lifted, thus enabling writing to be made more fluid for the user. This time function has a triggering role insofar as it enables scrolling to be triggered in the input zone without any additional action being required on the part of the user (which would degrade the user's experience).

In a first variant, the predetermined length of time T is a function of the position of the current graphics object (i.e. OG4 in the present example) within the input zone 26 (by way of example, the length of time T is a function of the position of OG4 along the main input axis in the input zone, i.e. the horizontal axis in this example). By way of example, it is possible to envisage that the length of time T becomes shorter when the current graphics object is close to the end (i.e. to the right in this example) of the input zone 26.

The auto-scrolling function may also be triggered solely when the current graphics object is in a predetermined portion (e.g. along the main input axis) of the input zone 26 (e.g. in the second half on the right-hand side).

In a second variant, the predetermined length of time T is a function of the total trace length of the graphics object(s) being displayed along the main input axis (i.e. the horizontal axis in this example) in the input zone. For example, if the total trace length along the main input axis exceeds a threshold value, then the predetermined length of time T is shorter.

The above-described first and second variants may be combined at will depending on circumstances. These variants enable input ergonomics to be further improved for the user.

The input method can thus continue to be executed in the same manner for each subsequent graphics object.

The description of this implementation continues below with reference to FIGS. 6B-6F and 7B. In this example, the device 2 also implements an optional function, referred to as a "space-switch", that seeks to insert a space indicator after the last graphics object when auto-scrolling has been performed. It will nevertheless be understood that the auto-scrolling function may be performed without this additional space-switch function.

Figure 6C:
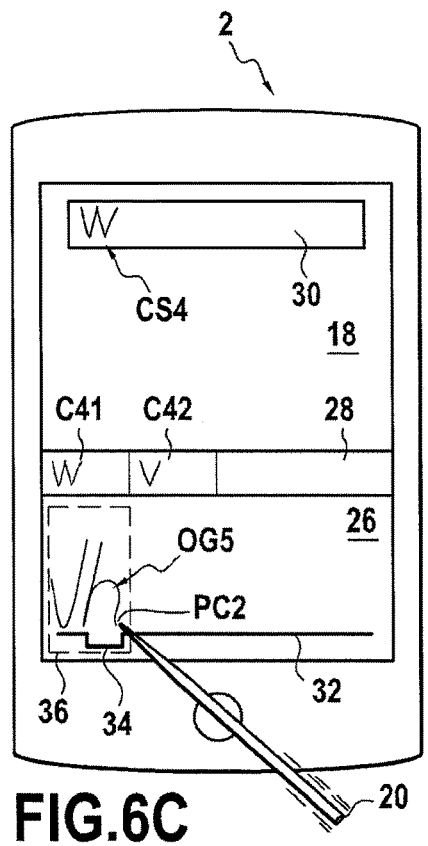

In this example, once the graphics object OG4 has been shifted in the input zone 26, the device 2 displays (E56) in the input zone 26 a graphics indicator 34 defining a region 36 of the input zone 26 that is adjacent to the current graphics object (i.e. OG4 in the present example) (FIGS. 6B and 6C). In the presently-described example, the graphics indicator 34 is in the form of a local deformation of the base line 32. This deformation 34 (in the form of an indentation in this example) indicates to the user a region 36 that is adjacent to the graphics object OG4 and in which the user can input a new graphics object OG5.

It can be understood that this is merely an example implementation, and that the graphics indicator 32 could have some other form, depending on requirements.

During a step E58, the device (i.e. the detection unit) then detects whether the user is inputting a subsequent graphics object OG5 on the graphics indicator 34, or more precisely in the region 36 of the input zone 26. In order to do this, the detection unit determines the position of the point of contact PC2 applied by the user using the stylus 20 in the zone 26 of the touch screen 18. On the basis of this position, the detection unit detects whether PC2 is or is not in the region 36.

If not, the device 2 deduces that the new current graphics object OG5 is independent from the preceding graphics object OG4. It therefore processes (E60) the graphics object OG5 independently of the graphics object OG4 (in the same manner as OG2 was processed independently of OG1, as described above). Under such circumstances, the storage unit is configured to store (E60) the graphics data DG5 of the subsequent graphics object OG5 throughout the time it is being input in a data group that is independent of the graphics data DG4.

Figure 7A:
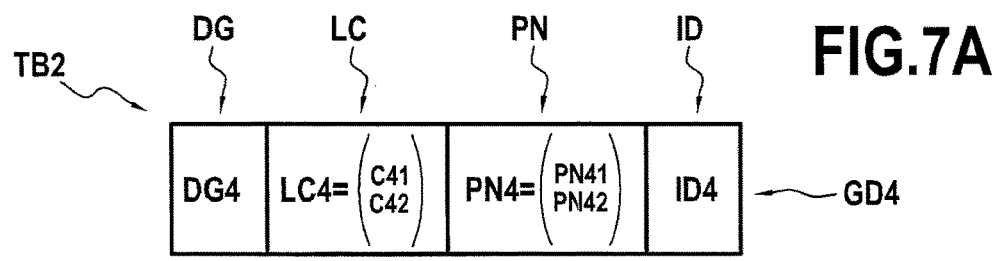
FIGS. 7A and 7B are tables showing data groups stored by the input device during different stages in the performance of the input method shown in FIGS. 6A to 6F.
Figure 7B:
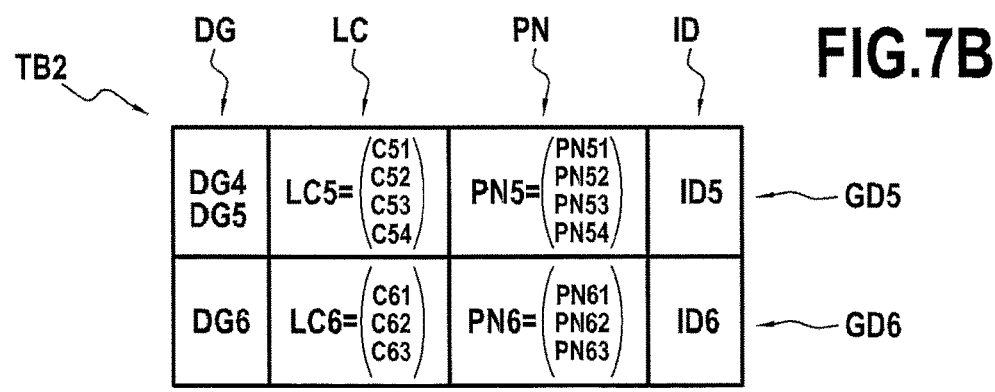
Figure 8:
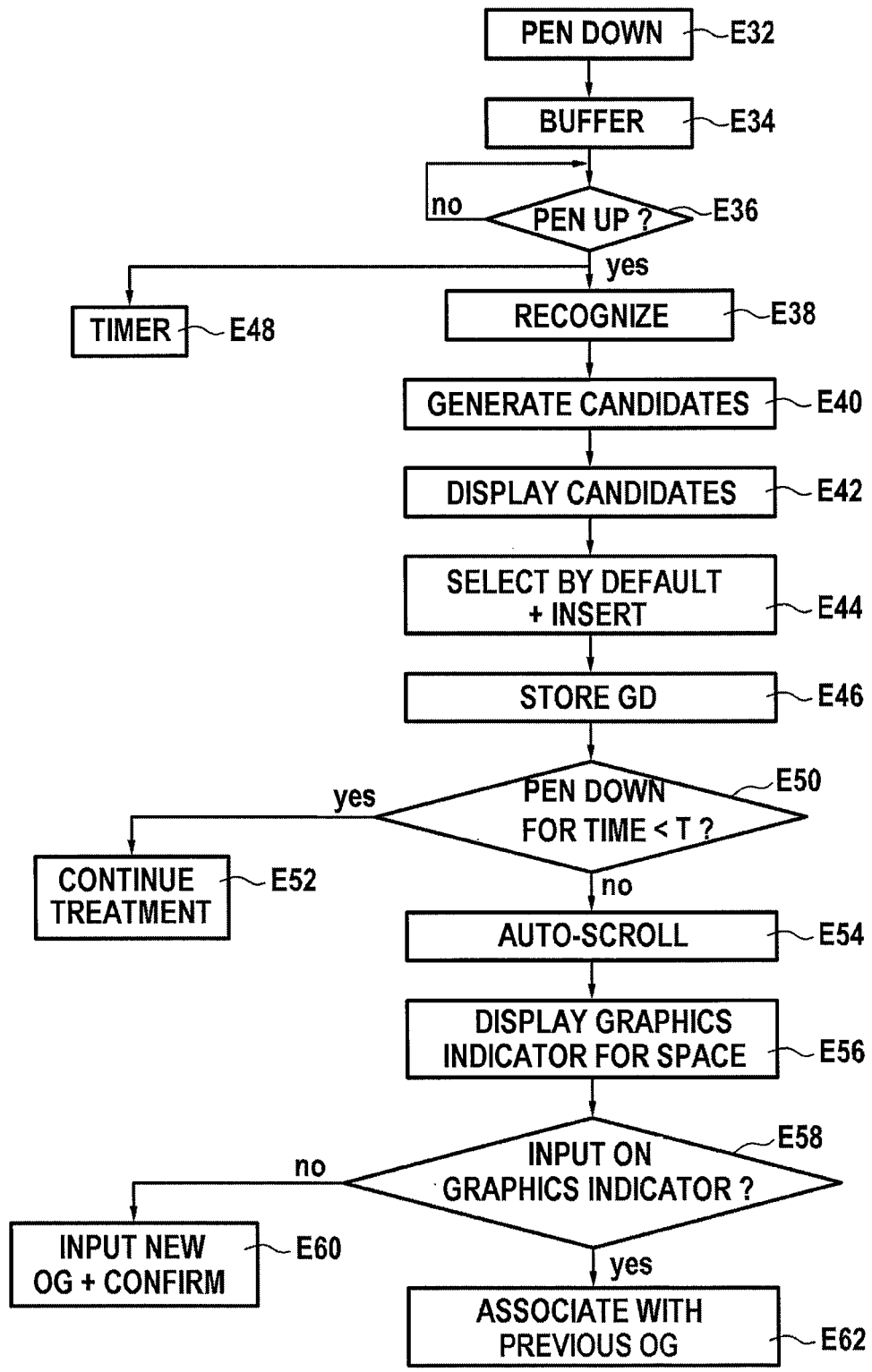
FIG. 8 is a flow chart showing the main steps of the input method in accordance with the second implementation of the invention.

In contrast, if the device 2 detects that the graphics object OG5 is being input in the region 36, it deduces that this new current graphics object OG5 belongs to the same word (or graphics set) as the preceding graphics object OG4. It therefore processes (E62) the graphics object OG5 in such a manner as to associate it with the graphics object OG4 (in the same manner as OG3 was associated with OG2, as described above). In other words, if the detection unit detects the start of a subsequent graphics object OG5 being input into the region 36, the storage unit is configured, throughout the time the graphics data DG5 of the subsequent graphics object OG5 is being input, to store (E62) it in association with the graphics data DG4 in the data group GD4 (renamed GD5 for reasons of clarity; FIG. 7B).

Figure 6D:
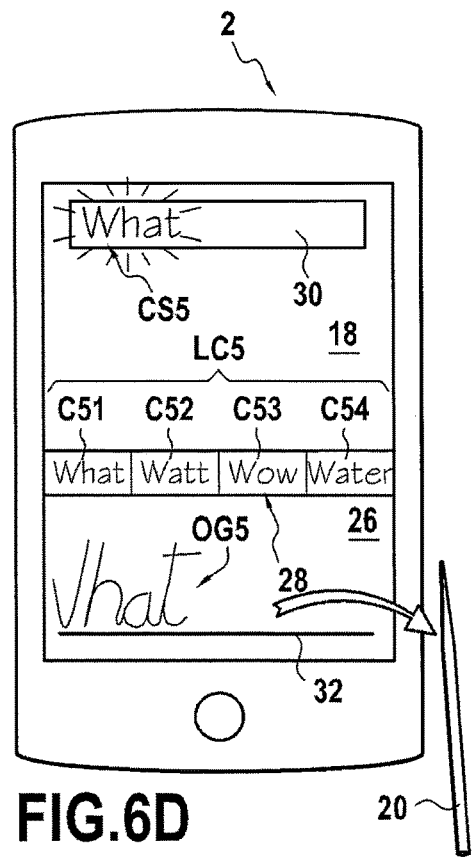
Figure 6E:
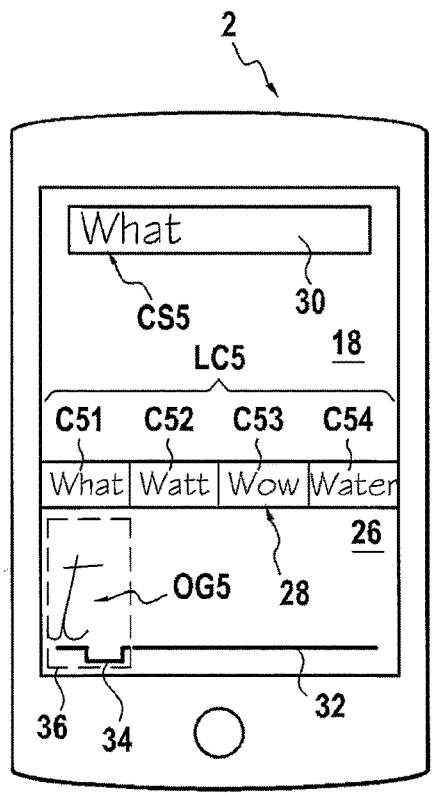
Figure 6F:
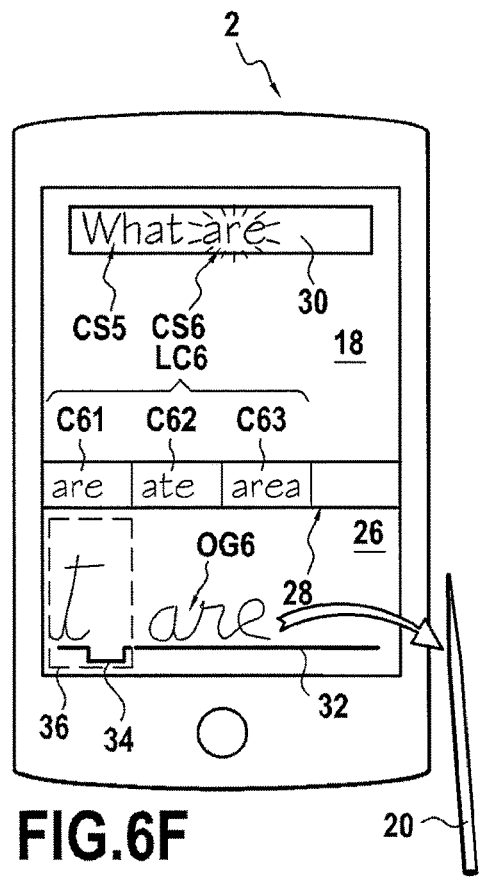

In the example shown in FIGS. 6C and 6D, the user writes continuously (without lifting the stylus) the word fragment "hat" immediately after the letter "W" in order to form the word "What". For reasons of simplicity, it is assumed in this example that there is no need to lift the stylus at an intermediate point in order to write the graphics object OG5 "hat", even though in practice, at least one lift is generally desirable in order to form the crossbar of the letter "t".

In another example, the graphics object OG5 could correspond to an additional portion of the preceding graphics object so as to form the same letter or the same symbol (e.g. OG5 could correspond to the dot of an "i" with the stroke being formed by OG4).

In the example presently under consideration, the device 2 detects (E62) that the stylus is then lifted, leading to the end of inputting the graphics object OG5. The processing of OG5 continues so as to associate OG5 with the graphics object OG4. The device 2 serves in particular to generate a list LC5 of candidate strings C51-C54 on the basis of the graphics data DG4 and DG5. A list PN5 of pertinence values PN51-PN54 that are associated with respective ones of the candidate strings C51-C54 is also generated by the recognition unit. The insertion unit selects a string CS5 as described above and inserts this string of symbols into the entry field 30.

Furthermore, the storage unit stores the graphics data GD4 and GD5 in a single data group GD5 that replaces the data group GD4, and in association with the list LC5 and PN5, together with an identifier of the selected string CS5 (Table TB2, FIG. 7B).

Still in this implementation, consideration is given to the situation where the device 2 proceeds with auto-scrolling of the graphics objects OG4 and OG5 in the input zone 26 (FIG. 6E) and causes the graphics indicator 34 to appear, as explained above with reference to FIG. 6B.

In this situation, the user writes the graphics object OG6 without lifting the stylus so as to form the word "are" in the input zone 26. This time the graphics object OG6 is input outside the region 36, so the device 2 continues processing of OG6 as a new graphics object independent from the preceding graphics object. In particular, the device 2 generates the list LC6 of candidate strings C61-C63 from graphics data DG6 of the graphics object OG6 and it displays this list in the display zone 28. The string C6S is selected from the candidate strings C61-C63 and is inserted into the entry field 30. A list PN6 of pertinence values PN61-PN63 associated with the respective candidate strings C61-C63 is also generated by the recognition unit.

In addition, the storage unit stores the graphics data DG6 in association with the lists LC6 and PN6 together with an identifier ID6 of the selected string CS6 in order to form a new data group GD6 (Table 2, FIG. 7B).

In a particular implementation of the invention, when the device 2 (i.e. its detection unit) detects that the subsequent graphics object (OG6) is situated outside the region 36, the insertion unit finally confirms the string CS6 inserted by default into the entry field 30. It is then no longer possible for the user to select another candidate string in the zone 28 in order to insert it in the entry field 30 (it is nevertheless possible to envisage a procedure to enable the user to correct this selection later on). In other words, the string CS6 included in the entry field 30 is no longer "active" once it has been confirmed.

In a particular implementation, after a second predetermined duration DP2 has elapsed from said confirmation, the processor module 4 is configured to cause the current graphics object to be displayed as block characters (an operation known as "fontification"), the storage means conserving the associated data group in memory for the above-defined first predetermined duration DP1. The block characters may be Unicode characters, for example. To do this, the processor module may for example perform a timer function that is triggered starting from said confirmation. The predetermined duration DP2 may in particular be adapted as a function of user needs.

In a variant, the processor module 4 is configured to trigger the "fontification" operation after the predetermined duration DP2 measured this time from a "pen up" event occurring while inputting a graphics object.

It can be understood from the above second embodiment and its variants that the auto-scrolling function and indeed the space-switch function serve to improve user input ergonomics by including triggers in the natural writing process that serve to control input management in intuitive manner. These functions make it possible to avoid the user needing to act on respective switches while performing input (e.g. by pressing on a button to shift the text), which would greatly reduce the fluidity of writing).

A third implementation is described below with reference to FIGS. 9A, 9B, 10 and 11A to 11D. Consideration is given in this example to the situation in which the user has input the phrase "hello how are you" into the input zone 26. The inputting of these four words leads to graphics objects OG7-OG16 having respective graphics data DG7-DG16 stored in respective data groups GD7, GD9, GD10, GD11, and GD16, as shown in FIG. 10 (Table TB3). Each of these data groups has a respective list LC7-LC16 of candidate strings, a respective list PN7-PN16 of associated pertinence values, and respective identifiers ID7-ID16 for the string inserted in the entry field 30.

The contents of the data groups GD7 to GD15 can be seen clearly from Table TB3 of FIG. 10, and it is therefore not described further herein.

Figure 9A:
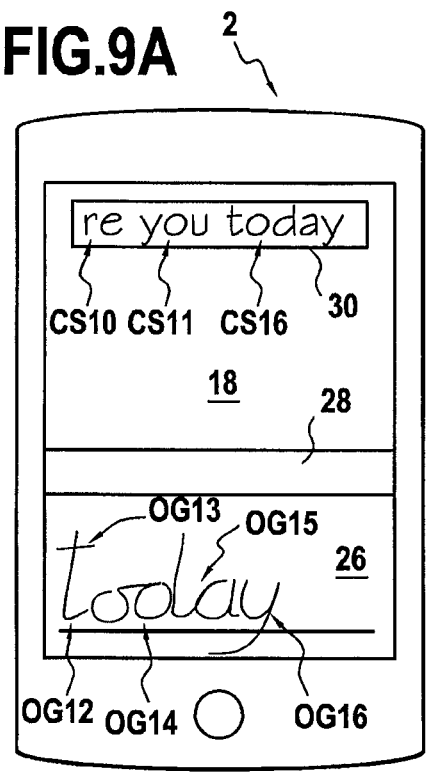

In this third implementation, a "navigation" function is performed by the device 2, and more precisely by the processor module 4. Consideration is given to the situation where only the strings CS10 and CS15 together with the portion of the string CS9 are being displayed (i.e. are visible) in the entry field 30 (FIG. 9A). Only the graphics objects OG12 to OG16 associated with the string CS16 are displayed in the input zone 26.

In response to a first predetermined interaction of the user with the input device (e.g. with the interface means, such as the touch screen 18, for example), the processor module 4 is configured to display in the entry field 30 at least any one of the strings of symbols that have previously been inserted and that was no longer being displayed in the entry field at the time of said command.

Figure 9B:
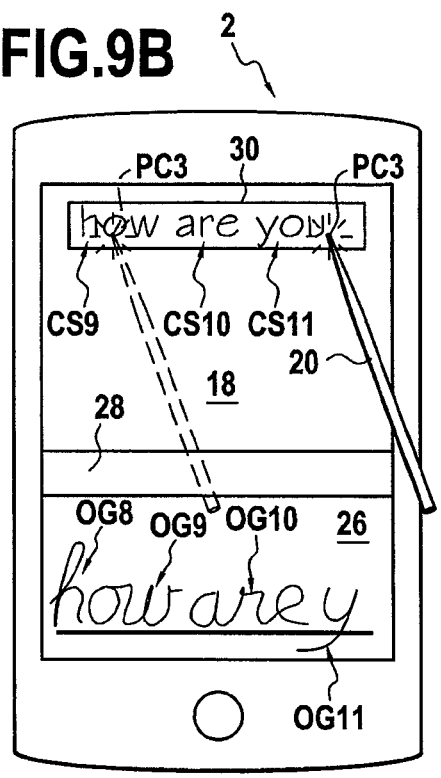

In the example of FIG. 9B, the user acts for example to cause the graphics objects CS9 ("how") and CS10 ("are") to be displayed in the entry field 30. This display command may for example be in the form of a first predetermined interaction of the user with the input device. The processor module 4 may for example be configured so that the first predetermined interaction is performed by the user pressing a point of contact PC3 on the touch screen 18 in the entry field 30 and moving said point of contact PC3 so as to cause said strings to scroll in the entry field 30 until the desired string is displayed.

In the example of FIG. 9B, the user thus causes the tip of the stylus 20 to slide from left to right on the touch screen 18 in the entry field 30. On detecting the sliding point of contact PC3 in the entry field 30, the device 2 (i.e. its processor module 4) causes the strings of symbols included in the entry field 30 to scroll so as to make the strings CS9, CS10, and SC11 in the present example to appear.

The device 2 (i.e. its processor module 4) is preferably configured to display in the input zone 30 at least one graphics object corresponding to one of the strings that the user has caused to be displayed in the entry field 30. In the present example, the device 2 causes the graphics object to scroll so as to display in the input zone 26 the graphics objects OG8 and OG9 that are both associated with the string CS9 together with the graphics object OG10 that is associated with the string SC10. Furthermore, only a portion of the graphics object OG11 associated with the string CS11 is displayed, here because of the limited size of the input zone 26.

The user can thus navigate in the entry field 30 in order to consult the various strings of symbols previously inserted in the entry field 30.

In one particular circumstance, the processor module 4 is configured to cause graphics objects to be displayed in real time in the input zone 26 to match the scrolling imparted in the entry field 30 by moving the point of contact. Thus, the user can continuously consult the graphics object corresponding to the strings of symbols being displayed in the entry field 30.

Figure 9C:
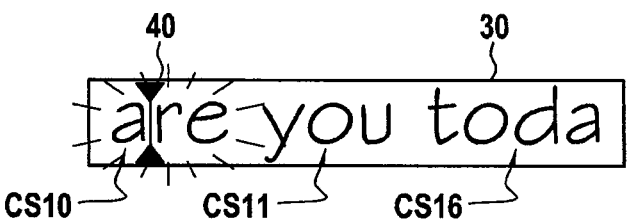
FIG. 9C shows the entry field of an application being executed on the input device in the third implementation of the invention.
Figure 9D:
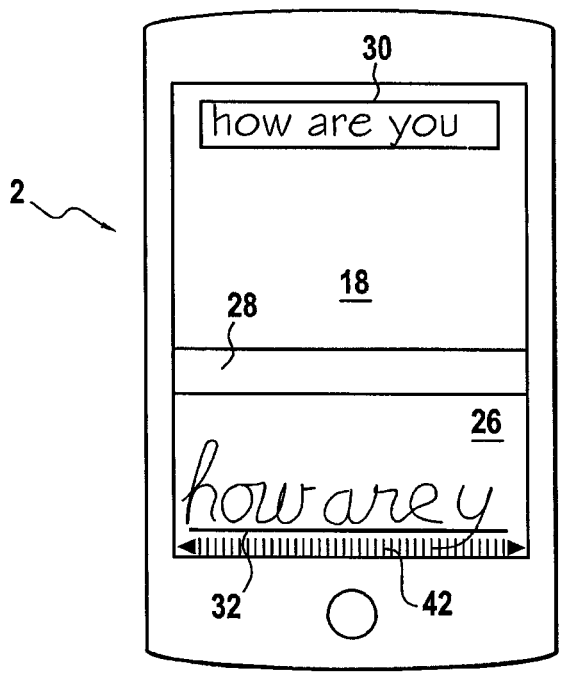
FIG. 9D shows a variant embodiment in which a scroll bar displayed on the screen enables the user to control scrolling in the entry field.

In a variant, the processor module 4 is configured so that the first predetermined interaction is performed by the user by pressing a point of contact against the touch screen on a scroll bar 42 displayed on the touch screen (e.g. under the base line 32) for this purpose and by moving said point of contact along said scroll bar so as to cause the strings in the entry field to scroll in real time until the desired string is displayed (FIG. 9D). This scroll bar 42 may for example be in the form of a rack or any zone of the touch screen 18 along which the user can move a finger or a stylus so as to navigate in the entry field 30.

In a particular embodiment, the processor module 4 is configured to respond to a second predetermined interaction of the user with the input device to display in the input zone 26 at least one of the previously input graphics objects that was no longer being displayed in the input zone 26 at the time of said second interaction.

The processor module 4 is preferably configured also to display in the entry field 30 at least a portion of a selected string corresponding to one of the graphics objects that has been caused to be displayed in the input zone by said second predetermined interaction.

By way of example, the processor module 4 is configured so that the second predetermined interaction is performed by a user pressing a point of contact against the touch screen 18 on the input zone 26 and then moving said point of contact so as to cause said graphics object to scroll in real time in the input zone 26 until the desired graphics object is displayed.

By way of example, the user can slide the tip of the stylus 20 from left to right on the touch screen 18 in the input zone 26. On detecting a sliding point of contact in the appropriate zone, the device 2 (i.e. its processor module 4) causes graphics objects included in the input zone 26 to scroll so as to cause the various graphics objects that have previously been input to appear therein.

The processor module 4 is preferably configured to act in real time to cause the entry field 30 to display strings selected to match the scrolling imparted by moving the point of contact.

All of the above-described variants for controlling scrolling may be combined in any manner in order to adapt the control of scrolling in the entry field and/or in the input zone depending on the needs of the user.

In preferred manner, when graphics objects are caused to scroll in the input zone, a corresponding scrolling action is performed in real time in the entry field, and vice versa, when strings of symbols are caused to scroll in the empty field, a corresponding scrolling action is performed in real time in the input zone. In this way, the user can navigate in the entry field and in the input zone and can continuously view graphics objects and the appropriate corresponding strings of symbols.

In a particular implementation, the device 2 (i.e. its processor module 4) is configured during scrolling of strings of symbols in the entry field 30 to display a marker to identify an "active" string that can be edited by the user.

FIG. 9C shows an example of a marker (referenced 40) that marks the word "are" (corresponding to the string CS9) as being active, thus informing the user that this word can be edited, should that be necessary.

Various editing functions may be performed by the input device 2. The processor module 4 may be configured to enable the user to use the interface unit to edit a string being displayed in the entry field 30, the data group of said edited string being modified by the processor module 4 in response to this editing and being stored by the storage means. The data group of the edited string can be updated because of the continuous connection provided between the various items of data by the device 2 throughout inputting.

In a particular implementation, the processor module 4 is configured so that the when the user overwrites a new graphics object on top of a previously input graphics object that is being displayed in the input zone 30, it updates the stored data group of the previously input graphics object, with the following: the graphics object of the new graphics object, the list of candidate strings, and the associated pertinence values generated by the recognition unit for the new graphics object, and the string selected by the insertion unit for the new graphics object.

In practice, the user can thus write over a graphics object that is being displayed in the input zone 26, thereby causing the new graphics object to be processed and causing the data group corresponding to the graphics object being edited in this way to be modified accordingly.

In order to edit a graphics object, the processor module 4 may be configured to enable the user to use the touch screen 18 to select a graphics object for editing. This selection may be performed in various ways. In a particular example, this selection is performed by applying a point of contact to the touch screen 18 at the graphics object that is to be edited (i.e. in the input zone 26), with selection then causing the corresponding string inserted in the entry field to be selected as the active string.

By way of example, FIG. 11A shows the user selecting the graphics object OG7 (i.e. the word "how") in the input zone 26 by tapping on the touch screen 18 with the stylus at the location of the object OG7. This selection causes the string CS7 present in the entry field 30 to be selected as the active string.

In a particular implementation, the processor module 4 is configured to respond to a third predetermined interaction of the user with the input device to insert a space between two graphics objects that are being displayed in the input zone 26. It is possible to envisage performing this function in various ways.

In a particular implementation, the third predetermined interaction consists in pressing the point of contact against the touch screen and in causing it to slide towards the bottom of the touch screen 18 so as to "draw" a downward vertical stroke between the symbols where it is desired to insert a space (e.g. as shown in FIG. 11B). A first down stroke serves to open a space between the two symbols. Where appropriate, a second down stroke between the same two symbols serves to increase the amount of space previously inserted by the first stroke.

In particular variants, FIGS. 11C, 11D and 11E, 11F, and 11G show other strokes that the user can draw on the touch screen 18 (e.g. in the input zone 26) in order to edit what has already been input. For example, one or more graphics objects may be deleted by causing the point of contact to slide from right to left over the graphics object(s) to be deleted (FIG. 11C).

The user can also delete space between two graphics objects that are spaced apart from each other by drawing a vertical stroke, this time upwards between the two graphics objects in question (FIG. 11D). As shown in FIG. 11D, other strokes may be envisaged for deleting (or shrinking) a space. Each time such a stroke is performed it serves to reduce the space between the two graphics objects until this space has been deleted completely, where appropriate.

The user can also press a point of contact for a predetermined length of time (e.g. 2 seconds) against a graphics object in order to cause that object to be selected (FIG. 11E), with such selection then enabling the object to be edited in specific manner.

FIG. 11F shows a function of editing in two steps. Initially, the user presses a point of contact between two graphics objects that are situated one above the other in the input zone. On detecting such a point of contact for a predetermined length of time, a dashed line appears between the two objects. Thereafter, the user can make use of this dashed line or of a cursor provided for this purpose in order to insert space in the vertical direction between the graphics objects in question.

FIG. 11G shows an editing function enabling the user to modify easily the size of a graphics object. To do this, the user presses a point of contact in the vicinity of the object and draws a stroke at least substantially surrounding the object in order to select it for subsequent editing. On the object being selected, a frame appears around the object, thus making it possible subsequently to change the size of the selected graphics object by the user moving one of the dots on the touch screen.

To summarize, the present invention enables graphics objects to be input into an input device and enables the graphics objects to be converted into corresponding strings of symbols that are inserted in an entry field of an application being executed on the input device. The device can group certain graphics objects together if necessary and can store the graphics data of one (or more) graphics objects in association with candidate strings, pertinence values, and the identifier of the string inserted in the entry field. By way of example, this storage is maintained at least for a predetermined duration, and preferably until the user has input all of the graphics objects (e.g. until the user has given final confirmation to the message or until the application of the entry field 30 has been closed).

By way of example, the present invention may perform functions in particular for navigation and/or editing, as described above.

Various functions (auto-scrolling, space-switch, . . . ) involving actions that are triggered automatically being included in the natural writing process serve to improve significantly the ergonomics of such inputting from the point of view of the user.

This invention finds a particular application in inputting text or characters of alphanumeric type (or more generally characters complying with the Unicode standard).

A person skilled in the art will understood that the implementations and variants described above merely constituted non-limiting examples of the invention. In particular, the person skilled in the art can envisage any combination of the variants and implementations described above in order to satisfy some particular need.

What is claimed is:

1. A device suitable for being used by a user to input symbols into an entry field, the device comprising:
    a memory including instructions;
    a touch screen that displays, in an input zone of the touchscreen, a current graphics object that is input manually; and
    a processor, operably connected to the memory and the touch screen, that executes the instructions to perform operations comprising:
        detecting a start of input and an end of input of said current graphics object in said input zone;
        storing, on detecting the start of input of said current graphics object, graphics data corresponding to said current graphics object throughout the time that the current graphics object is being input;
        generating, from said graphics data, candidate strings, each having at least one symbol, each of said candidate strings being associated with a pertinence value representative of the pertinence of said candidate string relative to said graphics data;
        inserting, into said entry field, a string selected from said candidate strings as a function of their pertinence;
        storing, in association with said graphics data, said candidate strings and their associated pertinence values, together with an identifier of the selected string, said association forming a first data group;
        conserving said first data group in the memory for a first predetermined duration;
        accepting editing input from the user to edit a string being displayed in the entry field; and
        modifying and storing the data group of said edited string.

2. The device according to claim 1, wherein the operations further comprise:
    upon detecting the end of input of the current graphics object and no subsequent start of input of a graphics object within a predetermined length of time starting from said detecting of the end of input, shifting the display of the current graphics object in the input zone so as to release space in said input zone for inputting a subsequent graphics object.

3. The device according to claim 2, wherein the predetermined length of time is a function of the position of the current graphics object in the input zone.

4. The device according to claim 2, wherein the predetermined length of time is a function of the total length of the trace along the main input axis of the graphics objects being displayed in the input zone.

5. The device according to claim 2, wherein the operations further comprise:
    once said shifting has been performed, displaying a graphics indicator in the input zone to define a region of the input zone adjacent to the current graphics object; and
    upon detecting the start of input of a subsequent graphics object in said region, storing the graphics data of the subsequent graphics object throughout the time that the subsequent graphics object is being input in association with the graphics data of the first data group.

6. The device according to claim 5, wherein the operations further comprise:
    upon detecting the start of the subsequent graphics object being input outside said region of the input zone, confirming said selected string.

7. The device according to claim 6, wherein the operations further comprise:
    after a second predetermined duration measured from said confirming, displaying the current graphics object in block characters; and
    conserving said first data group in the memory during said first predetermined duration.

8. The device according to claim 5, wherein the graphics indicator represents an empty space in the input zone between the current graphics object and an unused portion of the input zone.

9. The device according to claim 2, wherein the operations further comprise:
    once said shifting has been performed, displaying a graphics indicator in the input zone to define a region of the input zone adjacent to the current graphics object; and
    upon detecting a start of input of a subsequent graphics object outside said region, storing the graphics data of the subsequent graphics object throughout the time that the subsequent graphics object is being input in a second data group independent of said first data group.

10. The device according to claim 1, wherein each said graphics object represents a handwritten symbol.

11. The device according to claim 1, wherein the operations further comprise:
    accepting input from the user, via the touch screen, to select a graphics object for editing.

12. The device according to claim 11, wherein said selection is performed by pressing a point of contact against the touch screen on the graphics object to be edited, said selection causing the corresponding string inserted in the entry field to be selected as the active string.

13. The device according to claim 1, wherein the operations further comprise:
    replacing in the entry field, and in response to a predetermined command, the selected string with another candidate string chosen from among the candidate strings.

14. A method performed by an input device comprising a processor and a touch screen that displays, in an input zone of the touch screen, a current graphics object that is input manually, the method comprising:
- detecting a start and an end of said current graphics object being input in said input zone;
- upon detecting the start of said current graphics object being input, storing graphics data corresponding to said current graphics object throughout the time that the current graphics object is being input;
- generating candidate strings of at least one symbol from said graphics data, each of said candidate strings being associated with a pertinence value representative of the pertinence of said candidate string relative to said graphics data;
- inserting, in said entry field, a string selected from among said candidate strings as a function of the pertinence value of the string that was selected;
- storing, in association with said graphics data, said candidate strings and their associated pertinence values, together with an identifier of said string that was selected, said association forming a first data group;
- conserving said first data group during a first predetermined duration;
- editing a string being displayed in the entry field; and
- modifying and storing the data group of said edited string in response to said editing.

15. The method according to claim 14, the method further comprising:
- replacing in the entry field, and in response to a predetermined command, the selected string with another candidate string chosen from among the candidate strings.

16. A non-transitory computer readable data medium storing a computer program including instructions that when executed by a processor, perform a method comprising:
- detecting a start and an end of a current graphics object being input in an input zone of a touch screen that is operable connected to the processor;
- upon detecting the start of the current graphics object being input, storing graphics data corresponding to the current graphics object throughout the time that the current graphics object is being input;
- generating candidate strings of at least one symbol from the graphics data, each of the candidate strings being associated with a pertinence value representative of the pertinence of the candidate string relative to the graphics data;
- inserting, in an entry field displayed by the touch screen, a string selected from among the candidate strings as a function of the pertinence value of the string that was selected;
- storing, in association with the graphics data, the candidate strings and their associated pertinence values, together with an identifier of the string that was selected, the association forming a first data group;
- conserving the first data group during a first predetermined duration;
- editing a string being displayed in the entry field; and
- modifying the data group of the string being displayed, in response to the editing.

* * * * *